United States Patent [19]

Simäk

[11] Patent Number: 4,467,560
[45] Date of Patent: Aug. 28, 1984

[54] METHOD FOR SORTING OF SEED

[76] Inventor: Milan Simäk, Björnvägen 440, S-902 60 Umea, Sweden

[21] Appl. No.: 433,737

[22] Filed: Oct. 12, 1982

[30] Foreign Application Priority Data

Oct. 9, 1981 [SE] Sweden .............................. 8105997

[51] Int. Cl.³ .............................................. A01B 79/00
[52] U.S. Cl. .......................................... 47/58; 209/2; 209/4; 209/11; 209/162; 209/172; 209/173
[58] Field of Search .................... 47/58, 14, 16; 209/2, 209/3, 4, 11, 162, 172, 173

[56] References Cited

U.S. PATENT DOCUMENTS

Re. 17,003 6/1928 Warren ................................ 209/173
3,530,372 9/1970 Laukien ............................ 47/14 X
3,852,914 12/1974 Levengood ............................ 47/58

Primary Examiner—Robert B. Reeves
Assistant Examiner—Glenn Foster
Attorney, Agent, or Firm—Hill, Van Santen, Steadman & Simpson

[57] ABSTRACT

A method for separation of seeds, in which the seeds are incubated in a suitable environment and then dried to produce a pronounced difference in moisture content between filled-dead seeds and filled-viable seeds. These two seed fractions are then separated from each other by utilizing the moisture content difference.

The seed fractions may e.g. be separated from each other by placing seeds in a liquid the density of which is somewhat lower than the density of viable seeds but higher than the density of filled-dead seed. In such a case the filled-dead seeds will float up whereas the viable seeds sink.

3 Claims, 2 Drawing Figures

METHOD FOR SORTING OF SEED

BACKGROUND OF THE INVENTION (a) Field of the Invention

This invention relates to a method for improving the germinability of a bulk of seed by removing from the bulk, as far as possible, all non-germinable seed, i.e. all seeds that are empty, attacked by insects, mechanically damaged and filled-dead.

(b) Prior Art

Whereas a number of methods for sorting out non-germinable seeds of the two first mentioned catagories have been proposed, and have come to a comparatively extensive use, there is still missing a method for sorting out seeds of the last mentioned category. Particularly as far as seeds for the production of forest plants are concerned, the occurence of filled-dead seeds in a seed bulk may reduce the total germinability thereof to such an extent that the seeds become unsuitable for a commercial production of forest plants.

SUMMARY OF THE INVENTION

The present invention has for its object to remedy the just mentioned deficiency.

To the just mentioned object, there is provided a method for sorting of seeds which the seeds are incubated in a suitable environment, then the seeds within a suitable time after the interruption of the incubation are dried for a sufficient period of time to establish a pronounced moisture content difference between filled-dead seeds and viable seeds, and these two seed fractions are then separated from each other by utilizing the produced moisture content difference.

In the present case the word (incubation) is used to denote the starting up of germination processes which are terminated before the root tips start to emerge from the seeds.

The method according to the invention, which will sometimes below be called the IDS-method based on (I) for "incubation", (D) for "drying" and (S) for "separation", is based on the biological principle that the evaporation speed of the water is different for viable and dead seeds when the seeds are dried, subsequently to incubation in a suitable environment. During such a drying step a viable seed looses the water soaked up therein much more slowly than a dead seed. Therefore, considerable differences as to moisture content, density, electrical conductivity etc. arise between the two seed categories. This difference remains for a rather considerable period of the drying and are utilized for separation of dead and viable seeds. The separation may be carried into effect in a plurality of different ways, such as in a rising air-flow, on a vibrating table, in a suitable liquid or electrostatically etc.

The invention is disclosed in more detail below with reference had to the accompanying drawing.

AS SHOWN ON THE DRAWING

Figure 1:
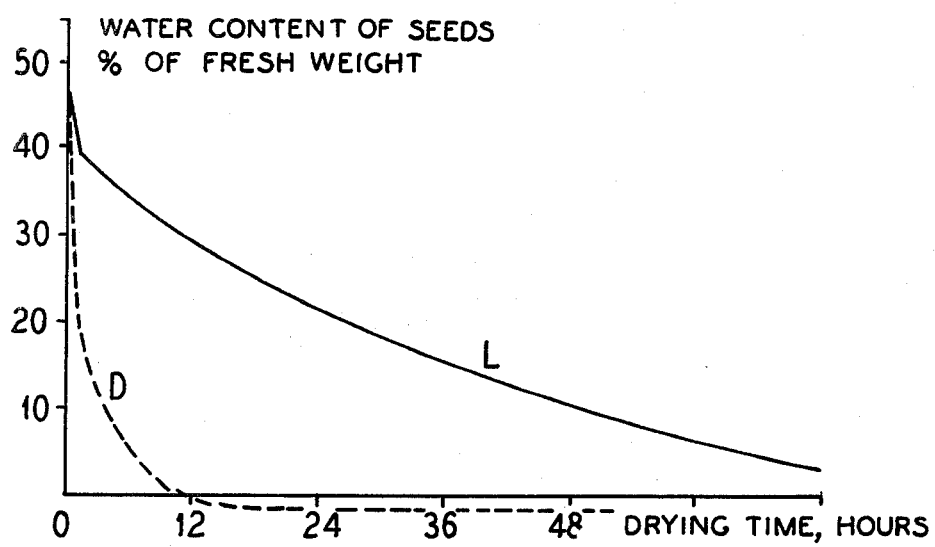
FIG. 1 is a diagram which illustrates the moisture content as a function of the drying time for a viable seed (L) and a filled-dead seed (D), respectively.

FIG. 1 shows that viable seeds (L) and dead seeds (D) that had been incubated for 3 days had a moisture content of about 45% at the start of the drying. During the drying the dead seeds lose the water more quickly than the viable ones. After about 12 hours drying the first mentioned ones have a weight which is even less than before the incubation. This result is due to the fact that during the incubation some decomposition products leave the dead seeds and leak out on the wet incubation support.

Figure 2:
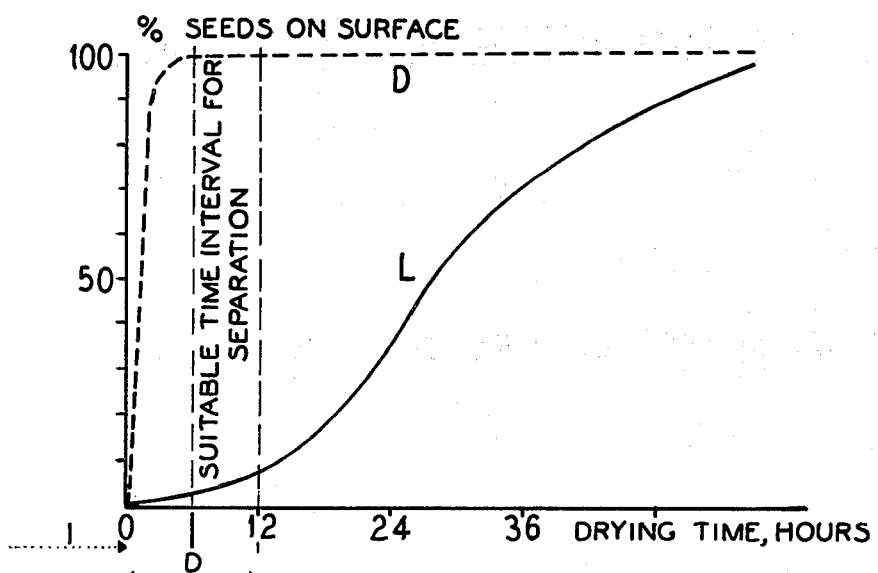
FIG. 2 is a diagram which shows the proportion, in percent, of floating and non-floating seeds, respectively, as a function of the drying time in hours in a practical laboratory test.

FIG. 2 illustrates two seed samples having a germinability of 98% (L) and 10% (D), respectively, which have been laid out for germination at a temperature of 15° C. for 3 days (Incubation). Subsequently, seeds of the two fractions have been dried at a temperature of +15° C. in a constant chamber (Drying). After predetermined intervals (hours) of the drying, the two seed fractions were separately soaked in water and the proportion of seeds that were floating on the surface was noted, expressed in % of the total number of seeds (Separation). The curve D shows that almost all seeds from that fraction remained floating on the surface of the water after about 6 hours drying. As opposed to that, the seeds of the fraction L needed almost ten times more drying time until they all became floating. According to this figure the separation of a L+D mixed seed bulk was most efficient after about 6–12 hours of drying. In the same manner as in this example with two different samples, each individual dead or viable seed of a mixed seed bulk would behave.

EXAMPLE

The germinability of a sample of filled pine seeds, collected at a seed plantation, was only 79% according to a laboratory test. Within this value there are also about 3% abnormal seed sprouts which appear to be more common with plantation seeds than with "wild" seeds. The 21% of the seeds which did not germinate were well filled but dead. The reason for the death may essentially be frost which occurred at the plantation during the last phase of the maturity process of the seed. Of course, a seed quantity of this low technical quality would not be suitable for single-kernel sowing by production as potted plants, as the sowing would result in a high percentage of empty pots. On the contrary, to obtain an acceptable result, it would be necessary to utilized multi-kernel sowing.

In an attempt to improve this plantation seed quality to such an extent that it should possibly be useful for single-kernel sowing, it was subject to an IDS-treatment in the following manner:

I=The seeds were first soaked in water (16 hours) and were spread out in an about 2 cm thick layer in an incubator at a temperature of +15° C. in light and 100% humidity. The incubation was interrupted after 3 days.

D=The seeds were dried for 12 hours at a temperature of +15° C., 35% relative humidity in a lighted constant chamber (about 800 lux).

S=The separation was carried out in a vessel with water. The dead seeds floated on the water surface and could be skimmed off, whereas the viable seeds sunk to the bottom. By this separation two fractions were obtained: 73% of the seeds were disposed on the bottom and constituted so called "germinable seeds", whereas the rest, 27% from the surface constituted so called "non-germinable seeds". Thus, the separation intensity in this case was 27%.

The two fractions that were obtained in this way and a control quantity of untreated seeds were dried at a temperature of 20° C. in an air flow, down to a moisture content of about 5%, and were then stored for 4 days at a temperature of −5° C. Then, the seeds were sown in boxes housing 336 paperpots/box in 3 repetitions (boxes) per test. The sowing was carried out manually with one seed/pot. The boxes were disposed in a greenhouse, and were attended to in accordance with the normal routines of the nursery (watering airing etc.,) The germination was checked after 21 days according to the normal criterions at the nursery. The result of the IDS-treatment was as follows:

1. The separation and removal of 27% of the seeds from the original bulk increased the germinability at the nursery from 67% up to 90%.
2. The germinability of the fraction called "germinable seeds" (G%=90) could hardly be increased more as the fraction in question contained some mechanically damaged and abnormal seeds. Such seeds do often germinate, but they are not able to give viable plants. However, the laboratory tests indicate that after a certain modification of the IDS-mothod, at least some of the mechanically damaged seeds could be removed from that fraction.

IDS-treated seed can be dried and stored at least 4 days at a low temperature before sowing, without loss of the effect of the treatment. Further, treated seeds germinate quicker than untreated seeds due to the fact that the incubation process improves upon the germinability.

3. The fraction called "non-germinable seeds" was entirely useless. The 13 % seeds of this fraction that germinated made up only 3,5% of the original seed bulk. Laboratory tests indicate moreover, that these germinable seeds that have been removed exhibit a lower vitality than the seeds of the fraction called "germinable seeds".

From the above it should be evident that the IDS-method enables one to:

improve the quality of a seed bulk which, without treatment, cannot be used for a commercially economic plant production due to its low germinability. Seeds of that low quality are present in huge quatities in seed stores;

utilize single-kernel sowing instead of two or multi-kernel sowing in plant production in paperpots etc. With single-kernel sowing of IDS-treated seeds an economically, technically and biologically much better result may be obtained than with two or multi-kernel sowing of untreated seeds;

better utilize genetically valuable seeds, e.g. seeds from seed plantations for the production of plants.

What I claim is:

1. A method of sorting seeds, comprising the steps of:
   (a) incubating the seeds in a humid atmosphere for a period of time;
   (b) thereafter drying the seeds in a less humid atmosphere for a period of time, thereby producing a pronounced difference in moisture content between viable and non-viable seeds; and
   (c) by using the moisture content difference, separating non-viable seeds from viable seeds.

2. A method according to claim 1, wherein said step of separating uses the difference in seed densities resulting from said moisture content difference.

3. A method according to claim 1, wherein said separating is done by placing all the seeds in a liquid having a density greater than non-viable seeds, but less than that of the viable seeds, whereby viable seeds sink and non-viable seeds float.

* * * * *

UNITED STATES PATENT AND TRADEMARK OFFICE
CERTIFICATE OF CORRECTION

PATENT NO. : 4,467,560

DATED : August 28, 1984

INVENTOR(S) : Milan Simak

It is certified that error appears in the above-identified patent and that said Letters Patent is hereby corrected as shown below:

On the title page Item (76) inventor's name should read

-- Milan Simak --.

Signed and Sealed this

Ninth Day of April 1985

[SEAL]

Attest:

DONALD J. QUIGG

Attesting Officer

Acting Commissioner of Patents and Trademarks